US012090874B2

(12) United States Patent
Jun et al.

(10) Patent No.: US 12,090,874 B2
(45) Date of Patent: Sep. 17, 2024

(54) CHARGING DEVICE

(71) Applicants: Hyundai Motor Company, Seoul (KR); Kia Corporation, Seoul (KR)

(72) Inventors: Changhan Jun, Hwaseong-si (KR); Junho Park, Cheongju-si (KR); Seunghyun Han, Suwon-si (KR); Semin Woo, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 285 days.

(21) Appl. No.: 17/697,365

(22) Filed: Mar. 17, 2022

(65) Prior Publication Data

US 2022/0410740 A1    Dec. 29, 2022

(30) Foreign Application Priority Data

Jun. 28, 2021    (KR) .......................... 10-2021-0083676

(51) Int. Cl.
*B60L 53/22*        (2019.01)
*B60L 53/14*        (2019.01)
*H02M 1/42*         (2007.01)

(52) U.S. Cl.
CPC .............. *B60L 53/22* (2019.02); *B60L 53/14* (2019.02); *H02M 1/4216* (2013.01); *H02M 1/4233* (2013.01); *H02J 2207/20* (2020.01)

(58) Field of Classification Search
CPC .......... B60L 53/22; B60L 53/14; B60L 53/20; H02M 1/4216; H02M 1/4233; H02M 1/10; H02M 1/126; H02M 1/007; H02M 1/36; H02M 3/01; H02M 3/285; H02M 3/33573; H02M 3/33584; H02M 1/44; H02M 3/33576; H02M 7/217; H02M 1/0043; H02M 1/0064; H02M 1/4225; H02J 2207/20; H02J 7/06; H02J 7/007182;

(Continued)

(56) References Cited

U.S. PATENT DOCUMENTS

2017/0149346 A1 * 5/2017 Mouridsen ............ H02M 7/487
2019/0312509 A1 * 10/2019 Kim ......................... H02J 7/14

(Continued)

FOREIGN PATENT DOCUMENTS

JP    2017121174 A    7/2017
KR    20210077104 A    6/2021

*Primary Examiner* — Paul Dinh
(74) *Attorney, Agent, or Firm* — SLATER MATSIL, LLP

(57) ABSTRACT

An embodiment charging device includes a power factor correction (PFC) circuit including first, second and third inductors and first, second and third switch legs connected to the first, second and third inductors, respectively, a relay network configured to control connection between the first, second and third inductors and first, second and third input terminals according to a phase of a power grid connected to the first, second and third input terminals, wherein the relay network includes a first relay connected between a neutral point and the third inductor, and a capacitor having a first end connected to the neutral point with respect to the first, second and third input terminals and a second end connected to ground, wherein the first end of the capacitor is positioned closer to the neutral point than the first relay.

20 Claims, 10 Drawing Sheets

(58) Field of Classification Search
CPC ........ H02J 7/04; Y02T 10/70; Y02T 10/7072;
Y02T 90/14; B60Y 2200/91
USPC ........................................................ 320/109
See application file for complete search history.

(56) References Cited

U.S. PATENT DOCUMENTS

2020/0321796 A1\* 10/2020 Chang .................... H02M 1/10
2021/0178919 A1    6/2021 Yeo et al.

\* cited by examiner

CHARGING DEVICE

CROSS-REFERENCE TO RELATED APPLICATIONS

This application claims the benefit of Korean Patent Application No. 10-2021-0083676, filed on Jun. 28, 2021, which application is hereby incorporated herein by reference.

TECHNICAL FIELD

The present disclosure relates to a charging device.

BACKGROUND

Charging a high voltage battery is essential for driving an electric vehicle. A charger mounted inside a vehicle may convert power inputted from commercial AC power into a voltage required by a battery. This is called an on-board charger (OBC). The OBC may include a power factor correction (PFC) circuit that corrects a power factor (PF) and a DC-DC converter that converts the power to the voltage required by the battery.

Noise generated during an operation of the OBC may affect an AC power grid of the OBC. In order to protect an electric load connected to the AC grid and used, the OBC has an AC input filter connected between an AC commercial power input and a PFC part. The AC input filter may be configured in one stage with a combination of a cross capacitor (X-cap) between grid lines, a capacitor (Y-cap) bypassing the grid line, and a common mode (CM) choke. The number of stages of the AC input filter may be determined according to a noise level, and when there are two or more AC input filters, the two or more AC input filters may be connected in series.

A typical 3-phase 4-wire (R, S, T, N) type of AC input filter may include, based on a first stage of the AC input filter, three X-caps between R-S, S-T, and R-T; three Y-caps between each of R, S, and T and the ground; and three CM chokes in R, S, and T. As the noise level increases, the number of the AC input filters connected in series increases, and the number of elements such as capacitors and inductors increases. Accordingly, the cost, volume, and weight for the AC input filter may increase.

The above information disclosed in this Background section is only for enhancement of understanding of the background of the invention, and therefore it may contain information that does not form the prior art that is already known to a person of ordinary skill in the art.

SUMMARY

Embodiments of the present invention provide a charging device that may perform a charging operation with high charging efficiency according to a wide range of input power sources and a wide range of battery charging voltages and that may minimize the number of elements for filtering an AC input.

An embodiment of the present invention provides a charging device including a power factor correction (PFC) circuit that includes first to third inductors (i.e., first, second and third), and first to third switch legs connected to the first to third inductors, respectively, a relay network that controls connection between the first to third inductors and first to third input terminals according to a phase of a power grid connected to the first to third input terminals, and a capacitor including one end connected to a neutral point with respect to the first to third input terminals and the other end connected to the ground. The relay network may include a first relay connected between the neutral point and the third inductor, and one end of the capacitor may be positioned closer to the neutral point than the first relay.

The relay network may include a second relay including one end connected to the first input terminal and the first inductor and the other end connected to the second input terminal and the second inductor, a third relay connected between the second input terminal and the second inductor, a fourth relay connected between the third input terminal and the third inductor, and a fifth relay connected in parallel with the third inductor.

The charging device may further include a first capacitor connected between the ground and a contact point closer to the first input terminal than one end of the second relay, in a first power line between the first input terminal and the first inductor, a second capacitor connected between the ground and a contact point closer to the second input terminal than the third relay, in a second power line between the second input terminal and the second inductor, and a third capacitor connected between the ground and a contact point closer to the third input terminal than the fourth relay, in a third power line between the third input terminal and the third inductor.

When the first to third input terminals are connected to respective phases of a three-phase power source, the relay network may connect each of the phases of the three-phase power source to a corresponding one of the first to third switch legs, and the PFC circuit may operate as a three-phase boost PFC, and when a single-phase power source is connected to one of the first to third input terminals, the relay network may connect the single-phase power source to the first and second switch legs and may connect the third switch leg to a neutral point, and the PFC circuit may operate as a single inductor type of interleaved single-phase full-bridge PFC.

When the first to third input terminals are connected to respective phases of the three-phase power source, the first relay, the second relay, and the fifth relay may be turned off, and the third relay and the fourth relay may be turned on.

When a single-phase power source is connected to the first input terminal, the first relay, the second relay, and the fifth relay may be turned on, and the third relay and the fourth relay may be turned off.

The charging device may further include a power converting circuit connected between the PFC circuit and the battery and transmitting power from the PFC circuit to the battery.

The first switch leg may include a first switch connected between the first inductor and a first input terminal of the power converting circuit and a second switch connected between the first inductor and a second input terminal of the power converting circuit. The second switch leg may include a third switch connected between the second inductor and a first input terminal of the power converting circuit and a fourth switch connected between the second inductor and a second input terminal of the power converting circuit. The third switch leg may include a fifth switch connected between the third inductor and a first input terminal of the power converting circuit and a sixth switch connected between the third inductor and a second input terminal of the power converting circuit.

When a single-phase power source is connected to the first input terminal, the first relay, the second relay, and the fifth relay may be turned on, and the third relay and the fourth relay may be turned off. During a period in which the single-phase power source is a positive voltage, a period in which the first switch, the third switch, and the sixth switch are turned on, and a period in which the second switch, the fourth switch, and the sixth switch are turned on may be repeated. During a period in which the single-phase power source is a negative voltage, a period in which the second switch, the fourth switch, and the fifth switch are turned on, and a period in which the first switch, the third switch, and the fifth switch are turned on may be repeated.

The relay network may further include a sixth relay connected in parallel to a resistor connected between the first input terminal and the first inductor, and the charging device may turn on the sixth relay after a peak of a voltage inputted to the PFC circuit.

When the first to third input terminals are connected to respective phases of a three-phase load, the relay network may connect each of the phases of the three-phase power source to a corresponding one of the first to third switch legs, and the PFC circuit may operate as a three-phase inverter. When a single-phase load is connected to one of the first to third input terminals, the relay network may connect the single-phase load to the first and second switch legs and may connect the third switch leg to a neutral point, and the PFC circuit may operate as a single-phase inverter.

The charging device may further include a first capacitor connected between the ground and a contact point closer to the first input terminal than one end of the second relay, in a first power line between the first input terminal and the first inductor, a second capacitor connected between the ground and a contact point closer to the second input terminal than the third relay, in a second power line between the second input terminal and the second inductor, and a third capacitor connected between the ground and a contact point closer to the third input terminal than the fourth relay, in a third power line between the third input terminal and the third inductor.

When the first to third input terminals are connected to respective phases of a three-phase load, the first relay, the second relay, and the fifth relay may be turned off, and the third relay and the fourth relay may be turned on.

When a single-phase load is connected to the first input terminal, the first relay, the second relay, and the fifth relay may be turned on, and the third relay and the fourth relay may be turned off.

The charging device may further include a relay control circuit that is connected to the first to third input terminals to detect one of the first to third input terminals to which a load is connected and controls the relay network.

The charging device may further include a power converting circuit that is connected between the PFC circuit and the battery and transmits power from the battery to the PFC circuit.

The first switch leg may include a first switch connected between the first inductor and a first input terminal of the power converting circuit and a second switch connected between the first inductor and a second input terminal of the power converting circuit. The second switch leg may include a third switch connected between the second inductor and a first input terminal of the power converting circuit and a fourth switch connected between the second inductor and a second input terminal of the power converting circuit. The third switch leg may include a fifth switch connected between the third inductor and a first input terminal of the power converting circuit and a sixth switch connected between the third inductor and a second input terminal of the power converting circuit.

When a single-phase load is connected to the first input terminal, the first relay, the second relay, and the fifth relay may be turned on, and the third relay and the fourth relay may be turned off. The first switch and the second switch may be alternately switched, the third switch and the fourth switch may be alternately switched, an on period of the fourth switch may entirely overlap an on period of the first switch, and an on period of the second switch may entirely overlap an on period of the third switch. The fifth switch may be turned off, and the sixth switch may be turned on.

The charging device may further include a relay control circuit that is connected to the first to third input terminals to detect one of the first to third input terminals to which a power source is connected and controls the relay network.

Embodiments of the present invention may provide a charging device that may perform a charging operation with high charging efficiency according to a wide range of input power sources and a wide range of battery charging voltages and may have a simpler circuit structure than that in the prior art.

In addition, embodiments of the present invention may provide a charging device that may minimize the number of elements for filtering an AC input.

Figure 1:
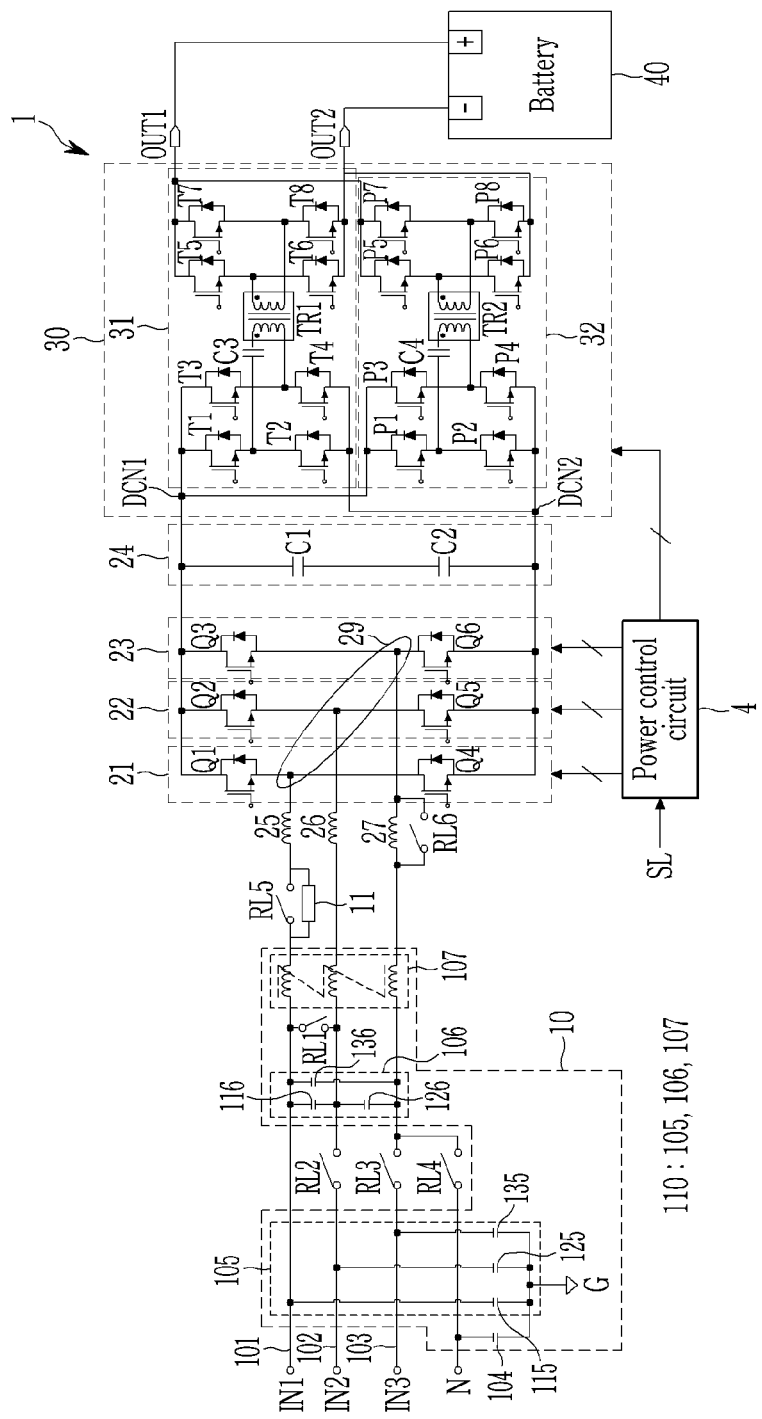
FIG. 1 illustrates a charging device according to an embodiment.

The following elements may be used in connection with the drawings to describe embodiments of the present disclosure.

1: charging device
   2: relay network
   3: relay control circuit
   10: AC input filter
   20: PFC circuit
   30: power converting circuit

DETAILED DESCRIPTION OF ILLUSTRATIVE EMBODIMENTS

A charging device according to an embodiment may be connected between a power system and a battery to charge the battery with power supplied from the power system, or to charge a load connected to the power system with power supplied from the battery.

Hereinafter, embodiments disclosed in the present specification will be described in detail with reference to the accompanying drawings, and in the present specification, the same or similar constituent elements will be denoted by the same or similar reference numerals, and a redundant description thereof will be omitted. The terms "module" and/or "unit, portion, or part" representing constituent elements used in the following description are used only in order to make understanding of the specification easier, and thus, these terms do not have meanings or roles that distinguish them from each other by themselves. In addition, in describing embodiments of the present specification, when it is determined that a detailed description of the well-known art associated with the present invention may obscure the gist of the present invention, it will be omitted. Further, the accompanying drawings are provided only in order to allow embodiments disclosed in the present specification to be easily understood and are not to be interpreted as limiting the spirit disclosed in the present specification, and it is to be understood that the present invention includes all modifications, equivalents, and substitutions without departing from the scope and spirit of the present invention.

Terms including ordinal numbers such as first, second, and the like will be used only to describe various constituent elements, and are not to be interpreted as limiting these constituent elements. The terms are only used to differentiate one constituent element from other constituent elements.

It is to be understood that when one constituent element is referred to as being "connected" or "coupled" to another constituent element, it may be connected or coupled directly to the other constituent element or may be connected or coupled to the other constituent element with a further constituent element intervening therebetween. In contrast, it should be understood that, when it is described that an element is "directly coupled" or "directly connected" to another element, no element is present between the element and the other element.

In the present application, it should be understood that the term "include," "comprise," "have," or "configure" indicates that a feature, a number, a step, an operation, a constituent element, a part, or a combination thereof described in the specification is present, but does not exclude a possibility of presence or addition of one or more other features, numbers, steps, operations, constituent elements, parts, or combinations, in advance.

FIG. 1 illustrates a charging device according to an embodiment.

In FIG. 1, an AC commercial power source connected through a power system is illustrated as a Y connection, but the commercial power source may be represented as a Δ connection. Hereinafter, it is obvious that the Δ connection may be applied instead of the Y connection in other drawings.

A charging device 1 includes a relay network 2, a relay control circuit 3, a power control circuit 4, an AC input filter 10, a PFC circuit 20, and a power converting circuit 30. The charging device 1 may convert the AC commercial power source to generate charging power for charging a battery 40. For example, a positive terminal (+) of the battery 40 may be connected to an output terminal OUT1, and a negative terminal (−) of the battery 40 may be connected to an output terminal OUT2.

The AC input filter 10 is an electromagnetic interference (EMI) filter for a plurality of power lines 101 to 103 connected between a plurality of input terminals IN1 to IN3 and the PFC circuit 20, and may eliminate noise that may be generated during an operation of the charging device 1. The power line 101 may be connected between the input terminal IN1 and the PFC circuit 20, the power line 102 may be connected between the input terminal IN2 and the PFC circuit 20, and the power line 103 may be connected between the input terminal IN3 and the PFC circuit 20.

The AC input filter 10 includes a capacitor 104 and at least one AC filter device 110. The number of the AC filter devices no in the AC input filter 10 may be determined according to a noise level generated in the power lines 101 to 103. For example, as the noise level increases, the number of the AC filter devices no may be increased for high insert loss. FIG. 1 illustrates one AC filter no device, but the present invention is not limited thereto. The capacitor 104 is connected between a neutral point N and the ground G, and a choke is not connected to the neutral point N.

The AC filter device no includes a Y capacitor device 105, an X capacitor device 106, and a choke device 107.

The Y capacitor device 105 includes three capacitors 115, 125, and 135. The capacitor 115 is connected between the power line 101 and the ground G at a position closer to the input terminal IN1 than a relay RL1. The capacitor 125 is connected between the power line 102 and the ground G at a position closer to the input terminal IN2 than a relay RL2. The capacitor 135 is connected between the power line 103 and the ground G at a position closer to the input terminal IN3 than a relay RL3. As described above, each of the three capacitors 115, 125, and 135 of the Y capacitor device 105 is positioned in front of the relay of each phase, so that common mode noise between each of the three power lines 101 to 103 and the ground G may be filtered. The choke device 107 may be coupled to the plurality of power lines 101 to 103 to filter the common mode noise. The plurality of power lines 101 to 103 may be wound around one core in the same direction to implement the choke device 107.

The X capacitor device 106 includes a capacitor 116 connected between the power line 101 and the power line 102, a capacitor 126 connected between the power line 102 and the power line 103, and a capacitor 136 connected between the power line 101 and the power line 103. The X capacitor device 106 may filter differential mode noise between two power lines among the three power lines 101 to 103.

The capacitor 104 may filter the common mode noise in a high frequency band by reducing a potential difference between a neutral point 29 of the PFC circuit 20 and the neutral point N compared with the ground G.

Each of the three capacitors 115, 125, and 135 of the Y capacitor device 105 filters the common mode noise between each of the three power lines 101 to 103 and the ground G, so that it is possible to equally match electric potentials between each of the three power lines 101 to 103 and the ground G. The capacitor 104 filters the common mode noise of a line (hereinafter, a neutral line) connected to the neutral point N, so that with respect to a reference potential of the ground G, the potential between the neutral point N and the ground G may be controlled to be the same as the potential between the three power lines 101 to 103 and the ground G. Even if the number of stages of the AC filter device no increases due to the increase of the noise level, the common mode noise of the neutral line may be filtered through one capacitor 104. In addition, since there is no choke connected to the neutral point N, the number of chokes for the neutral point N does not increase despite the increase in the number of the stages of the AC filter device 110.

The relay network 2 may control on/off of a plurality of relays RL1 to RL6 according to the phase of the power system connected to the input terminals IN1 to IN3 to control a connection relationship between the PFC circuit 20 and the power system. For example, when the charging device 1 converts power supplied from the power system to charge the battery, the relay network 2 may control the on/off of the plurality of relays RL1 to RL6 according to the phase of the AC commercial power source connected to the input terminals IN1 to IN3 to control the connection relationship between the PFC circuit 20 and the AC commercial power source.

The relay network 2 includes the plurality of relays RL1 to RL6, and the relay control circuit 3 may be connected to the plurality of input terminals IN1 to IN3 connected to the AC commercial power source to detect the phase of the AC commercial power source and to control the plurality of relays RL1 to RL6 according to the detected phase. The relay control circuit 3 may generate a plurality of relay control signals RLS1 to RLS6 for controlling the on/off of the plurality of relays RL1 to RL6 according to the detected phase to supply them to the plurality of relays RL1 to RL6. The plurality of relays RL1 to RL6 is turned on (closed) or turned off (opened) according to the plurality of relay control signals RLS1 to RLS6.

For example, when the AC commercial power source is a three-phase power source, the relay control circuit 3 may generate relay control signals RLS2 and RLS3 for turning on a plurality of relays RL2 and RL3 and relay control signals RLS1, RLS4, and RLS6 for turning off a plurality of relays RL1, RL4, and RL6 to supply them to the plurality of relays RL1 to RL6. In this case, the relay control circuit 3 may generate a phase detecting signal SL indicating the three-phase together to transmit it to the power control circuit 4.

In addition, when the AC commercial power source is a single-phase power source, the relay control circuit 3 may generate relay control signals RLS1, RLS4, and RLS6 for turning on a plurality of relays RL1, RL4, and RL6 and relay control signals RLS2 and RLS3 for turning off a plurality of relays RL2 and RL3 to supply them to the plurality of relays RL1 to RL6. In this case, the relay control circuit 3 may generate a phase detecting signal SL indicating the single-phase together to transmit it to the power control circuit 4.

The relay control circuit 3 may generate a relay control signal RLS5 that turns on the relay RL5 at a time point when a predetermined period elapses from a time point when a charging operation starts, regardless of the single-phase or three-phase, and may supply it to the relay RL5.

One end of the relay RIA is connected to one end of an inductor 25 and the input terminal IN1, and the other end of the relay RL1 is connected between the input terminal IN2 and one end of an inductor 26. The relay RL2 is connected to the input terminal IN2 and one end of the inductor 26, the relay RL3 is connected to the input terminal IN3 and one end of an inductor 27, and the relay RL4 is connected between the neutral point N and one end of the inductor 27. The relay RL5 is connected between the input terminal IM and one end of the inductor 25, and the relay RL6 is connected in parallel to the inductor 27. The plurality of relays RIA to RL6 may be implemented as an electronic relay or a mechanical relay.

The PFC circuit 20 includes three switch legs 21 to 23, three inductors 25 to 27, and a PFC link capacitor 24. The PFC circuit 20 may operate according to a switch control signal supplied from the power control circuit 4. The power control circuit 4 may control a switching operation of the PFC circuit 20 according to the case in which the AC commercial power source is a single-phase power source or three-phase power source according to the phase detecting signal SL.

When the AC commercial power source is the three-phase power source, the PFC circuit 20 receives a three-phase line-to-line voltage to operate as a 3-leg boost PFC. When the AC commercial power source is a single-phase input, the PFC circuit 20 receives a voltage between the input terminal IM and the neutral point N to operate as a PFC of a single inductor type of an interleaved single-phase full-bridge structure. That is, the PFC circuit 20 uses three input terminals IN1, IN2, and IN3 as a power source in a case of a three-phase, and uses a voltage between the input terminal IM and the neutral point N as a power source in a case of a single-phase. In a case of a single phase, the relay RL1 is turned on and all of the first to third switch legs 21 to 23 are used for power transmission, with the switch leg 23 being connected to the neutral point N, and the inductor 27 is deactivated by turn-on of the relay RL6. Then, it is converted into a single inductor structure between the input terminal IN1 and the neutral point N, and the PFC circuit 20 is an interleaved single-phase full-bridge structure. In this case, the PFC circuit 20 may operate as a unipolar totem pole control.

The PFC link capacitor 24 includes two capacitors C1 and C2, and generates a DC voltage by being charged with a current transmitted according to an operation of each of the three switch legs 21 to 23.

The power converting circuit 30 converts the voltage charged in the PFC link capacitor 24 to generate and supply a DC voltage suitable for a load. Two input terminals DCN1 and DCN2 of the power converting circuit 30 are connected to respective ends of the PFC link capacitor 24. Although no load is shown in FIG. 1, an example of the load may include a battery, and the battery may be connected between two output terminals OUT1 and OUT2 to be charged.

The power converting circuit 30 includes two DC-DC converters connected in parallel between the two input terminals DCN1 and DCN2 and the two output terminals OUT1 and OUT2. The structure in which the two DC-DC converters are connected in parallel is an example according to the embodiment, but the present invention is not limited thereto, and the power converting circuit 30 may be implemented with an appropriate number of DC-DC converters according to a size of the load.

A DC-DC converter 31 includes four switching elements T1 to T4 connected as a full-bridge to one side thereof, four switching elements T5 to T8 connected as a full-bridge to the other side thereof, an insulating transformer TR1 between the one side and the other side, and a capacitor C3.

A DC-DC converter 32 includes four switching elements P1 to P4 connected as a full-bridge to one side thereof, four switching elements P5 to P8 connected as a full-bridge to the other side thereof, an insulating transformer TR2 between the one side and the other side, and a capacitor C4.

The power control circuit 4 may control power converting operations of the DC-DC converter 31 and the DC-DC converter 32. For example, the power control circuit 4 may receive an output voltage supplied to the battery 40 as feedback to generate a control signal for controlling a switching frequency or duty ratio of the DC-DC converter 31 and the DC-DC converter 32 to supply it to the DC-DC converter 31 and the DC-DC converter 32. Since a detailed control method thereof is the same as the control method of the converter of the LLC resonant full-bridge structure, a detailed description thereof is omitted.

In FIG. 1, the DC-DC converters 31 and 32 are implemented as the LLC resonant full-bridges, but the present invention is not limited thereto, and they may be implemented as other types. The operation of the DC-DC converter is apparent to a person of ordinary skill in the art to which the present invention pertains, and thus a detailed description thereof is omitted.

Figure 2:
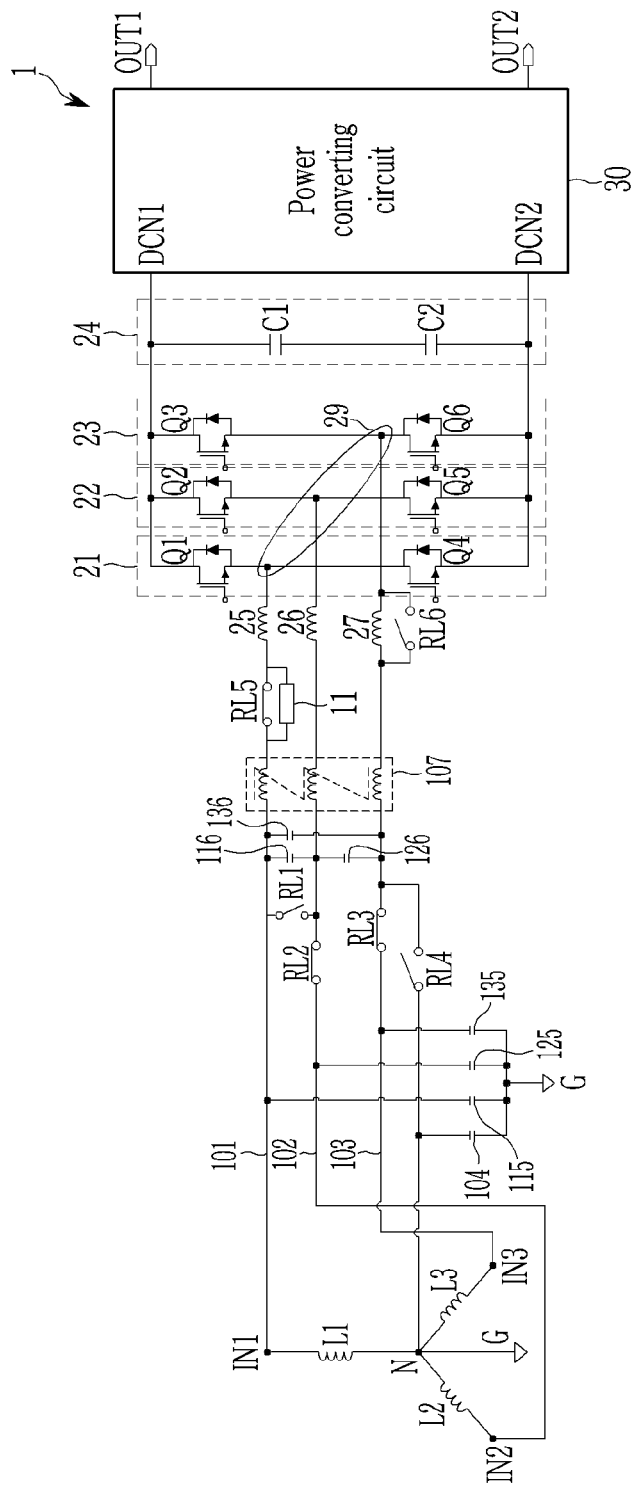
FIG. 2 illustrates, when an AC commercial power source is a three-phase power source, a circuit diagram for explaining an operation thereof.

FIG. 2 illustrates, when an AC commercial power source is a three-phase power source, a circuit diagram for explaining an operation thereof.

As shown in FIG. 2, a 3-phase power source is transmitted to each of the three input terminals IN1, IN2, and IN3 through three inductors L1, L2, and L3. In FIG. 2, the capacitor 104 may be connected between the node between the neutral point N and the relay RL4 and the ground G to filter the common mode noise of the neutral line.

The relay control circuit 3 detects that the AC commercial power source is a 3-phase power source, turns on the relays RL2 and RL3, turns off the relays RL1, RL4, and RL6, and turns on the relay RL5 after a voltage inputted to the PFC circuit 20 has peaked. The relay RL5 is a relay for protecting elements such as the PFC link capacitor 24 when an inrush current flows by the high voltage of the input terminal. Until the voltage input of the PFC circuit 20 reaches the peak, the relay RL5 is turned off, and an input from the input terminal IN1 is supplied to the PFC circuit 20 through a resistor ii. After reaching the peak, the relay RL5 is turned on, and the input from the input terminal IN1 is supplied to the PFC circuit 20 through the relay RL5, not through the resistor ii. The relay RL5 is turned off until the voltage input of the PFC circuit 20 reaches the peak regardless of a single-phase or a three-phase, and is turned on after the peak.

When the AC commercial power source is a 3-phase power source, the input terminals IN1, IN2, and IN3 are respectively connected to the inductors 25, 26, and 27, and the PFC circuit 20 operates as a 3-leg boost PFC. The current flowing through each inductor 25, 26, and 27 is transmitted to the PFC link capacitor 24 according to a switching operation of each of the first to third switch legs 21, 22, and 23. For example, the input terminal IN1 is connected to the inductor 25, and the inductor 25 and the first switch leg 21 operate as a boost PFC. A current flows in the inductor 25 by the voltage of the input terminal IN1, the current flowing in the inductor 25 during an ON period of a switch Q1 charges the PFC link capacitor 24, and a current flows through the inductor L1 and a switch Q2 during an OFF period of the switch Q1 and an ON period of the switch Q2.

When the AC commercial power source is a 3-phase power source, the relay RL4 is turned off, but a PCB pattern forming a neutral line is coupled with other power lines. Therefore, the common mode noise may occur in the neutral line through coupling. The relay RL4 is opened, but is not an opened circuit to noise due to radiative coupling. Unlike the prior art, in the embodiment of the present invention, one end of the capacitor 104 is connected between the neutral point N and the relay RL4, and the other end of the capacitor 104 is connected to the ground G. The capacitor 104 reduces a potential difference between the neutral line and the ground G, and the Y capacitor device 105 reduces a potential difference between the three power lines 101 to 103 and the ground G. That is, since the potential difference between the neutral line and the ground G is reduced like the potential difference between the three power lines 101 and the ground G, the common mode noise may be filtered in the neutral line.

Figure 3:
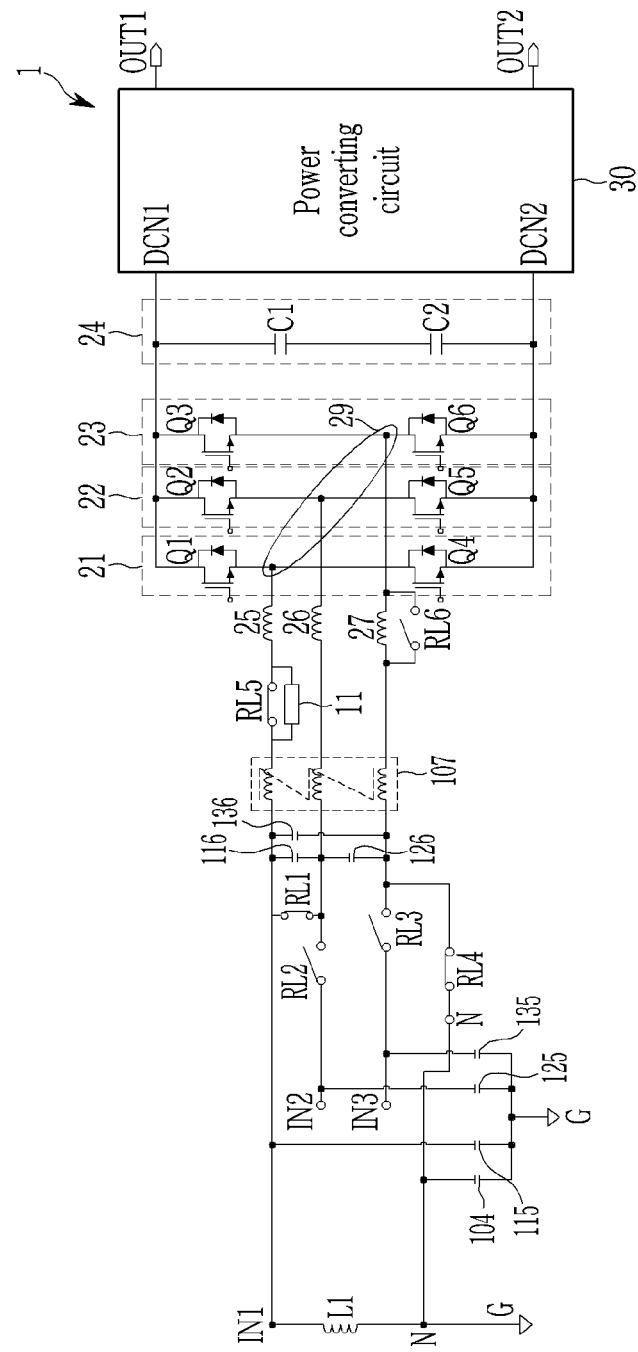
FIG. 3 illustrates, when an AC commercial power source is a single-phase power source, a circuit diagram for explaining an operation thereof.

FIG. 3 illustrates, when an AC commercial power source is a single-phase power source, a circuit diagram for explaining an operation thereof.

As shown in FIG. 3, a single-phase power source is transmitted to the input terminal IN1 through the inductor L1.

The relay control circuit 3 detects that the AC commercial power source is a single-phase power source, turns on the relays RL1, RL4, and RL6, turns off the relays RL2 and RL3, and turns on the relay RL5 after a voltage inputted to the PFC circuit 20 has peaked.

The relay RL1 is turned on, so that the input terminal IN1 is connected to the first switch leg 21 and the second switch leg 22, a current flowing through the inductor L1 branches to the first and second switch legs 21 and 22, and the first and second switch legs 21 and 22 operate in an interleaved manner.

The relay RL4 is turned on, so that the neutral point N and the third switch leg 23 are connected, and the relay RL6 is turned on, so that the PFC circuit 20 performs an interleaved full-bridge PFC operation with a single-phase single inductor structure. That is, the relay RL1 is turned on, so that the first to third switch legs 21 to 23 perform power transmission. The third switch leg 23 is connected to the neutral point N, and the inductor 27 is deactivated when the relay RL6 is turned on.

When the AC commercial power source is a single-phase power source and when the relay RL4 is turned on, one end of the capacitor 104 is connected to the neutral point N and the neutral point 29 of the PFC circuit 20, and the other end of the capacitor 104 is connected to the ground G. Even if the common mode noise occurs in the neutral line, the potential difference between the neutral point N and the ground G of the commercial power source and the potential difference between the neutral point and the ground G of the PFC circuit 20 are reduced by the capacitor 104. That is, the common mode noise of the neutral line may be filtered by the capacitor 104.

FIG. 4A to FIG. 4D illustrate, when an input power source is a single-phase power source according to an embodiment, circuit diagrams for explaining an operation of a PFC circuit.

Figure 4A:
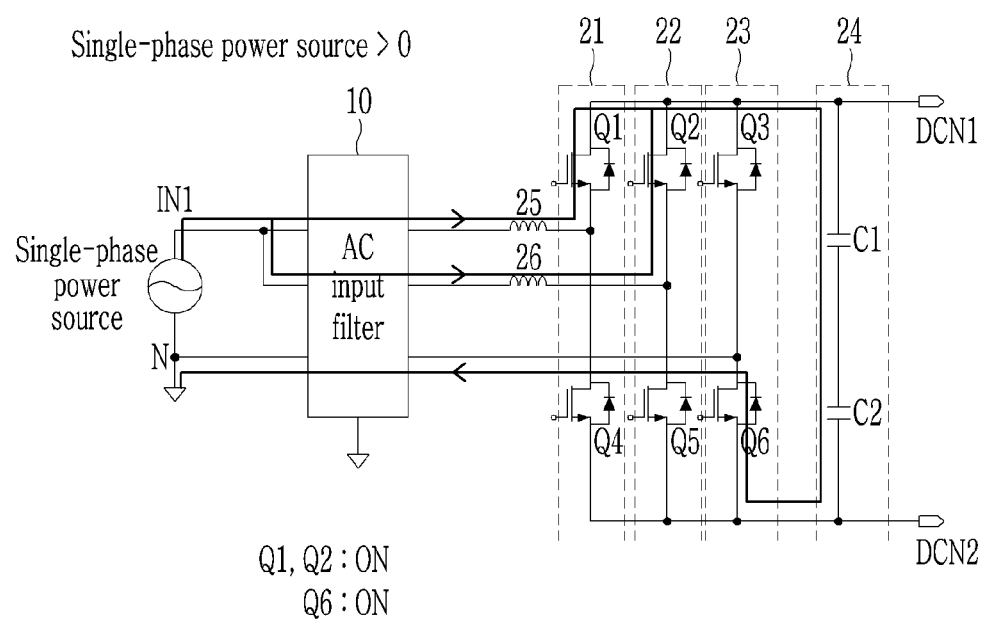
FIG. 4A to FIG. 4D illustrate, when an input power source is a single-phase power source according to an embodiment, circuit diagrams for explaining an operation of a PFC circuit.
Figure 4B:
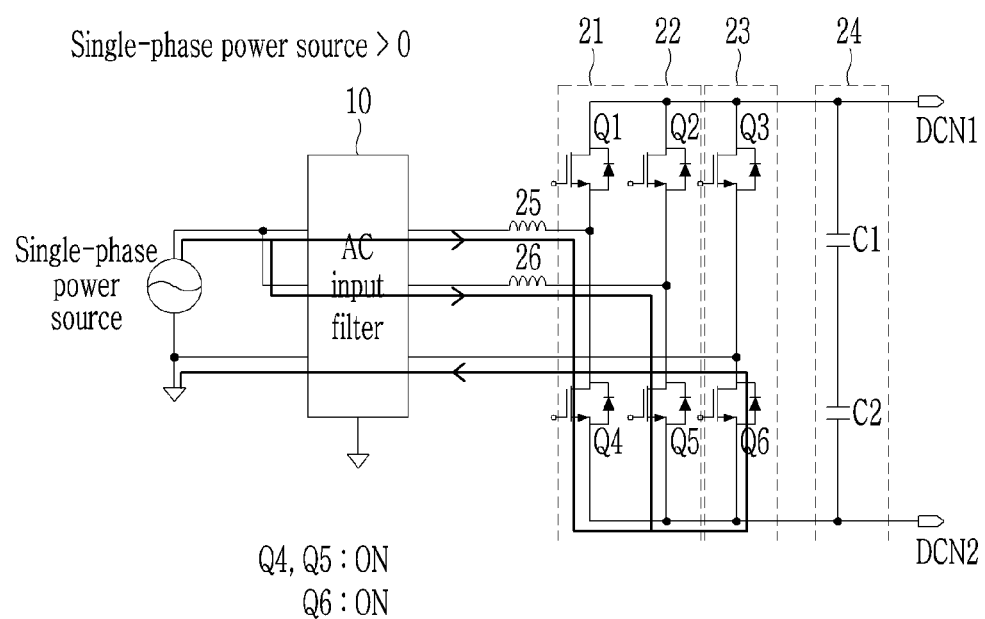
Figure 4C:
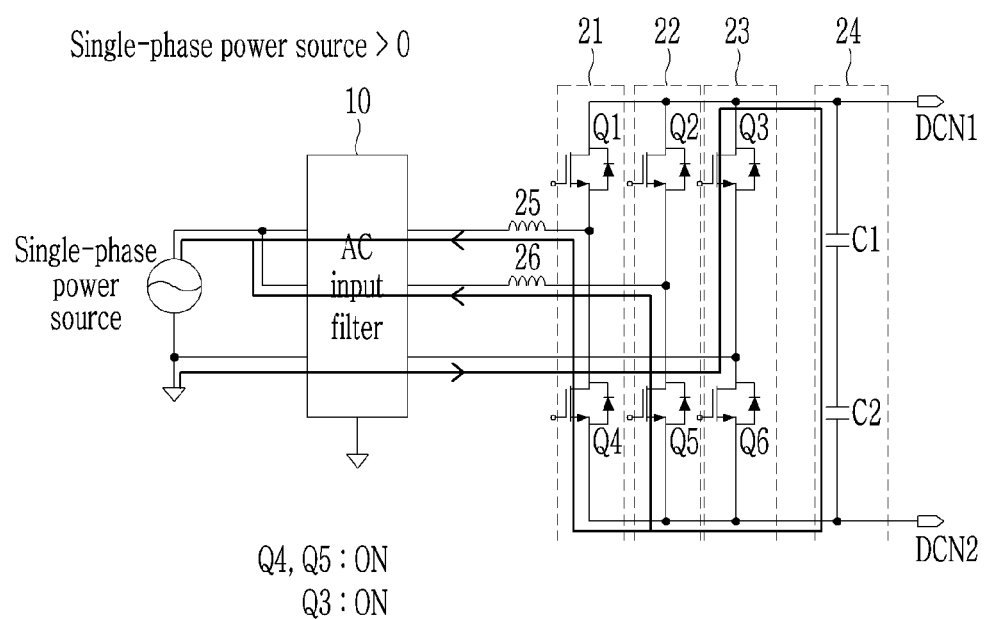
Figure 4D:
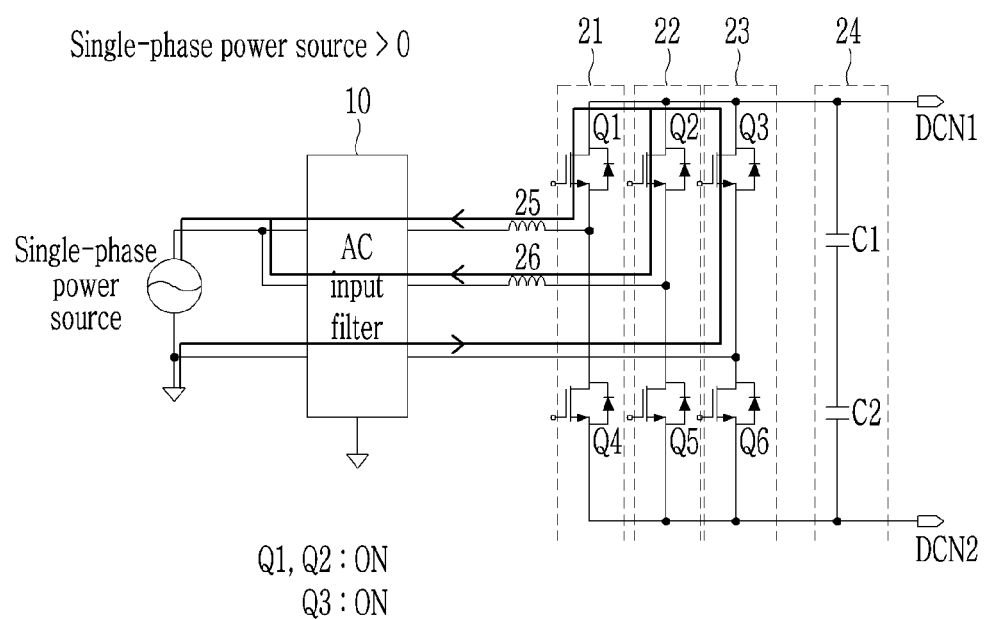

FIG. 4A and FIG. 4B illustrate current paths according to the operation of the first to third switch legs 21 to 23 when the single-phase power source, which is a sinusoidal wave, has a positive voltage. FIG. 4C and FIG. 4D illustrate current paths according to the operation of the first to third switch legs 21 to 23 when the single-phase power source, which is a sinusoidal wave, has a negative voltage. FIG. 4A and FIG. 4C illustrate power supplying operations of the PFC circuit 20, and FIG. 4B and FIG. 4D illustrate power recovering operations of the PFC circuit 20. As shown in FIG. 4A, during a period when switches Q1, Q2, and Q6 are turned on, a current flows through the inductors 25 and 26, the switches Q1 and Q2, the capacitors C1 and C2, and the switch Q6 by a voltage of the single-phase power source. During this period, power is supplied to the capacitors C1 and C2.

Then, as shown in FIG. 4B, during a period when switches Q4, Q5, and Q6 are turned on, a current flows through the inductors 25 and 26 and switches Q4, Q5, and Q6 by a voltage of the single-phase power source. During this period, a power recovering operation in which energy is stored in the inductors 25 and 26 is performed.

As shown in FIG. 4C, during a period when the switches Q3, Q4, and Q5 are turned on, a current flows through the switch Q3, the capacitors C1 and C2, the switches Q4 and Q5, and the inductors 25 and 26 by the voltage of the single-phase power source. During this period, power is supplied to the capacitors C1 and C2.

Then, as shown in FIG. 4D, during a period when the switches Q1, Q2, and Q3 are turned on, a current flows through the inductors 25 and 26 and the switches Q1, Q2, and Q3 by the voltage of the single-phase power source. During this period, a power recovering operation in which energy is stored in the inductors 25 and 26 is performed.

As a driving distance on a single charge of an electric vehicle is increased, an increase in battery capacity is required. Accordingly, large-capacity charging is required for an on-board charger (OBC), thus an increase in charging power is required.

A conventional charger has a two-stage structure of a PFC circuit and a DC/DC converter, and may be operated only under a single-phase input power condition. In order to implement charging in a three-phase power input condition, the chargers connected to each phase of the three-phase power source should be connected in three-parallel. Then, the circuit complexity thereof increases, resulting in an increase in material cost and volume/weight. A charger including only a PFC circuit implemented with a boost converter has a simple circuit structure, but normal charging is impossible when a battery required voltage thereof is lower than an input voltage thereof. A buck-boost type of charger may perform a charging operation in an entire period of an output voltage required by a battery, but its control is complicated and there is a section where an AC input voltage is low compared to the output voltage, so a power factor (PF) characteristic is disadvantageous, and since the boost converter is directly connected to the battery, a high output current ripple is applied to the battery, which adversely affects battery life and heat generation.

Embodiments of the present invention relate to a charging device including a relay network for converting a PFC circuit into a charging system optimized according to various AC power conditions, that is, various power conditions for each country. Embodiments of the present invention may provide a charging device that may perform a charging operation with high charging efficiency according to a wide range of input power sources and a wide range of battery charging voltages, and may have a simpler circuit structure than that in the prior art.

In the case of the prior art in which the OBC is designed for the three-phase input, it is difficult to generate and supply sufficient charging power for the single-phase input. For example, for the single-phase input, the conventional OBC could supply only 3.6 kW of charging power. However, the charging device 1 according to the embodiment may adjust the link voltage supplied to the power converting circuit 30 by using the PFC circuit 20 of the 3-phase 3-leg inverter type. Accordingly, the charging device 1 may supply sufficient charging power (for example, 7.2 kW) to the battery 40 even for the single-phase input.

In addition, since the charging device 1 according to the embodiment may adjust the link voltage, the ratio of the number of turns, which is a ratio between the number of turns on one side and the number of turns on the other side of transformers TR1 and TR2, may be designed close to 1:1. Through this, the charging device 1 may supply power to a load through the power system connected to the input terminal of the charging device 1 from the battery 40 in a power supplying direction (hereinafter, forward direction) for charging the battery 40 and an opposite direction thereof (hereinafter, reverse direction). The load may be a three-phase load or a single-phase load.

Hereinafter, the operation in which the charging device 1 supplies power from the battery 40 to the load will be described with reference to FIG. 5 to FIG. 7.

Figure 5:
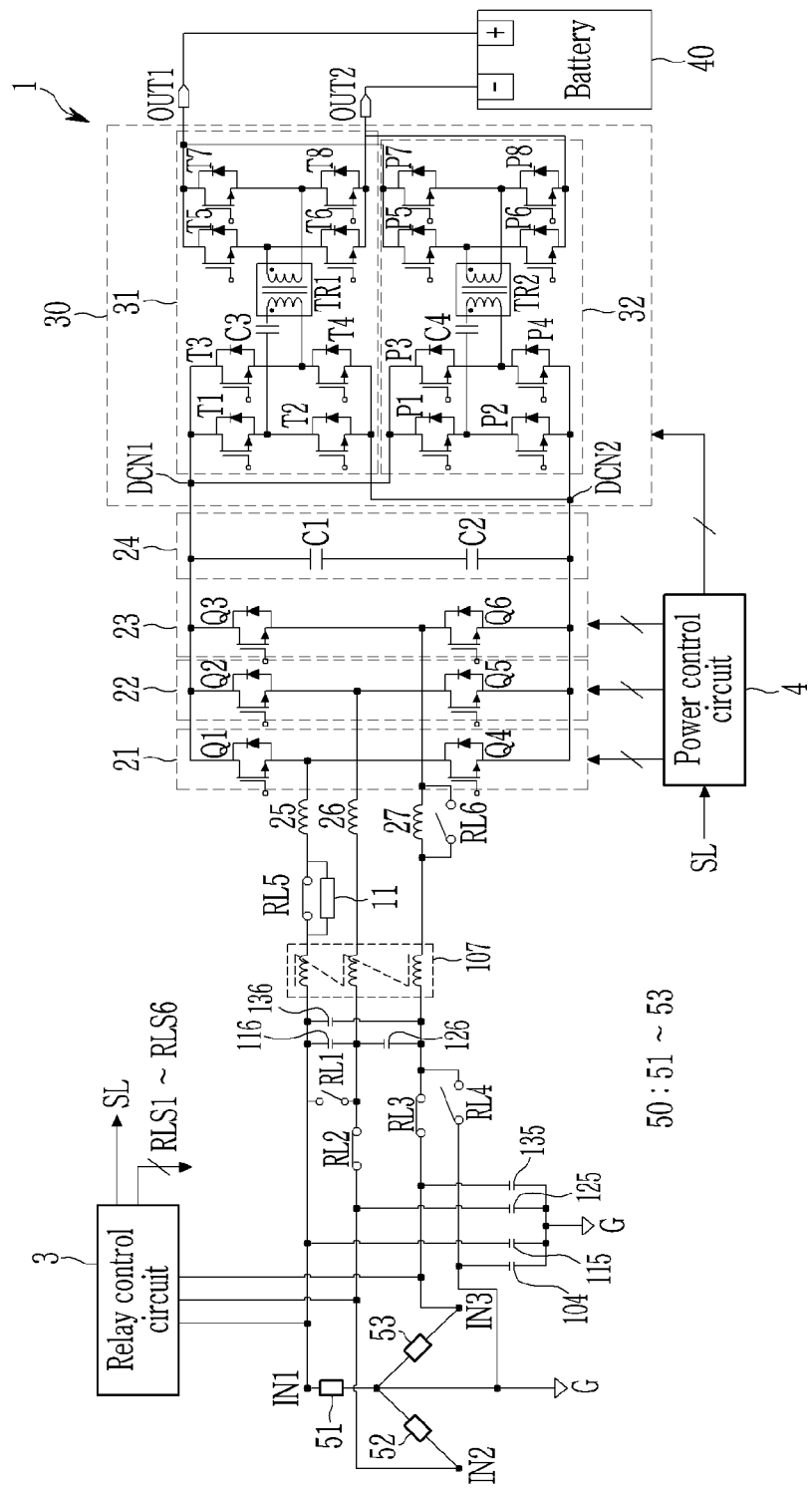
FIG. 5 illustrates a drawing for explaining an operation when a charging device according to an embodiment supplies power to a three-phase load in a reverse direction.

FIG. 5 illustrates a drawing for explaining an operation when a charging device according to an embodiment supplies power to a three-phase load in a reverse direction.

Respective phases of a three-phase load 50 are shown in FIG. 5 as three inductors 51 to 53. The inductor 51 is connected between the input terminal IN1 and the neutral point N, the inductor 52 is connected between the input terminal IN2 and the neutral point N, and the inductor 53 is connected between the input terminal IN3 and the neutral point N. In FIG. 5, the three-phase load 50 is shown as three inductors 51 to 53, but the present invention is not limited thereto. Each load of the three-phase load 50 may be implemented as one of a resistor, an inductor, and a capacitor, or a combination of at least two thereof.

Compared with FIG. 1, the same reference numerals are denoted for the same components, and duplicate descriptions will be omitted below.

The relay control circuit 3 may detect a load connected to the plurality of input terminals IN1 to IN3 to determine whether the load is a three-phase load or a single-phase load. When the load connected to the plurality of input terminals IN1 to IN3 is a 3-phase load, the relay control circuit 3 may generate the relay control signals RLS2 and RLS3 for turning on the plurality of relays RL2 and RL3 and the relay control signals RLS1, RLS4, and RLS6 for turning off the plurality of relays RL1, RL4, and RL6 to supply them to the plurality of relays RL1, RL4, and RL6. In this case, the relay control circuit 3 may generate the phase detecting signal SL indicating the three-phase together to transmit it to the power control circuit 4. The relay control circuit 3 turns on the relay RL5 at a time point when a predetermined period has elapsed from the start of the reverse charging operation.

The positive terminal (+) and the negative terminal (−) of the battery 40 are connected to the two output terminals OUT1 and OUT2, and power is supplied from the battery 40 to the power converting circuit 30 through the two output terminals OUT1 and OUT2. First, an operation in which power is supplied from the battery 40 to the PFC circuit 20 through the power converting circuit 30 will be described. Only one of the DC-DC converter 31 and the DC-DC converter 32 may perform the power supplying operation. For example, an operation in which the DC-DC converter 31 supplies power from the battery 40 to the PFC circuit 20 will be described. In this case, the switches P5 to P8 of the DC-DC converter 32 may be replaced with diodes.

The voltage between the positive terminal (+) and the negative terminal (−) of the battery 40 is supplied as the input voltage of the DC-DC converter 31. When the DC-DC converter 31 converts the input voltage in the reverse direction and supplies it to the PFC circuit 20, all switches T1 to T4 positioned at one side are turned off. According to the switching operation of the switches T5 to T8 positioned at the other side, a current path is formed through body diodes of the switches positioned at the one side.

For example, during the on period of the switches T5 and T8 and the off period of the switches T6 and T7, a resonant current flowing in the other side of the transformer TR1 flows through the switches T5 and T8, and power is transmitted to one side of the transformer TR1. In this case, the current flows through the body diodes of the switches T1 and T4, so power is supplied to the PFC circuit 20. Then, there is a dead time in which all switches T5 to T8 are turned off. After the dead time, during the on period of the switches T6 and T7 and the off period of the switches T5 and T8, a resonant current flowing in the other side of the transformer TR1 flows through the switches T6 and T7, and power is transmitted to one side of the transformer TR1. In this case, the current flows through the body diodes of the switches T2 and T3, so power is supplied to the PFC circuit 20. Then, there is the dead time in which all switches T5 to T8 are turned off. This operation is repeated, so that power is supplied from the battery 40 connected to the other side of the power converting circuit 30 to the PFC circuit 20 connected to the one side of the power converting circuit 30.

The PFC link capacitor 24 may be charged with the energy supplied from the DC-DC converter 31, and may smooth the voltage inputted to the PFC circuit 20. The PFC circuit 20 may supply AC power to the three-phase load 50 according to the switching operation of the first to third switch legs 21 to 23. For example, the power control circuit 4 controls the PFC circuit 20 to operate as a three-phase inverter according to the phase detecting signal SL. That is, the first to third switch legs 21 to 23 perform switching operations with a phase difference of 120 degrees, and the switching operations of the two switches (for example, Q1 and Q4) in each of the first to third switch legs 21 to 23 are complementary switching with a phase difference of 180 degrees. The operation of the three-phase inverter is a known technology, so a detailed description thereof is omitted.

The role of the capacitor 104 when the charging device 1 receives the three-phase AC commercial power source as an input and the role of the capacitor 104 when the charging device 1 supplies power to the three-phase load 50 as an output are the same. The capacitor 104 reduces the potential difference between the neutral line and the ground G, and the Y capacitor device 105 reduces the potential difference between the three power lines 101 to 103 and the ground G. That is, since the potential difference between the neutral line and the ground G is reduced like the potential difference between the three power lines 101 and the ground G, the common mode noise may be filtered in the neutral line.

Figure 6:
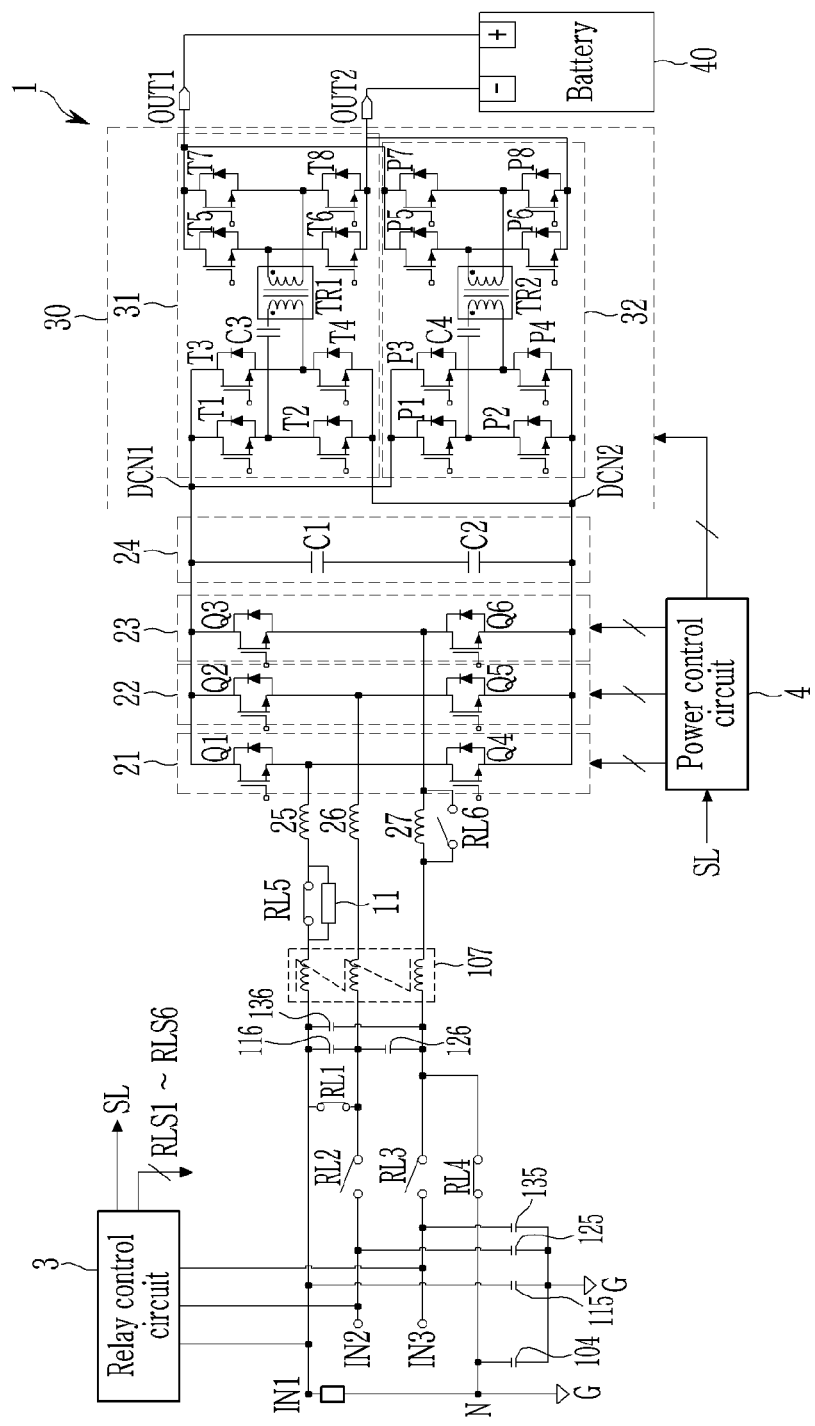
FIG. 6 illustrates a drawing for explaining an operation when a charging device according to an embodiment supplies power to a single-phase load in a reverse direction.

FIG. 6 illustrates a drawing for explaining an operation when a charging device according to an embodiment supplies power to a single-phase load in a reverse direction.

A single-phase load 60 may be implemented as one of a resistor, an inductor, and a capacitor, or a combination of at least two thereof. Compared with FIG. 1, the same reference numerals are denoted for the same components, and duplicate descriptions will be omitted below.

The relay control circuit 3 may detect a load connected to the plurality of input terminals IN1 to IN3 to determine whether the load is a three-phase load or a single-phase load. When the load connected to the plurality of input terminals IN1 to IN3 is a single-phase load, the relay control circuit 3 may generate the relay control signals RLS1, RLS4, and RLS6 for turning on the plurality of relays RL1, RL4, and RL6 and the relay control signals RLS2 and RLS3 for turning off the plurality of relays RL2 and RL3 to supply them to the plurality of relays RL1 to RL6. In this case, the relay control circuit 3 may generate the phase detecting signal SL indicating the single-phase together to transmit it to the power control circuit 4. The relay control circuit 3 turns on the relay RL5 at a time point when a predetermined period has elapsed from the start of the reverse charging operation.

The method in which power is supplied to the PFC circuit 20 through the power converting circuit 30 is omitted because it is the same as the previously described embodiment in which the three-phase load is connected thereto. Hereinafter, the operation of the PFC circuit 20 in the embodiment in which the single-phase load 60 is connected thereto will be described with reference to FIG. 7. As shown in FIG. 7, the PFC circuit 20 operates as a single-phase inverter.

The role of the capacitor 104 when the charging device 1 receives the single-phase AC commercial power source as an input and the role of the capacitor 104 when the charging device 1 supplies power to the single-phase load 60 as an output are the same. Even if the common mode noise occurs in the neutral line, the potential difference between the neutral point N and the ground G of the commercial power source and the potential difference between the neutral point 29 and the ground G of the PFC circuit 20 are reduced by the capacitor 104. That is, the common mode noise of the neutral line may be filtered by the capacitor 104.

Figure 7:
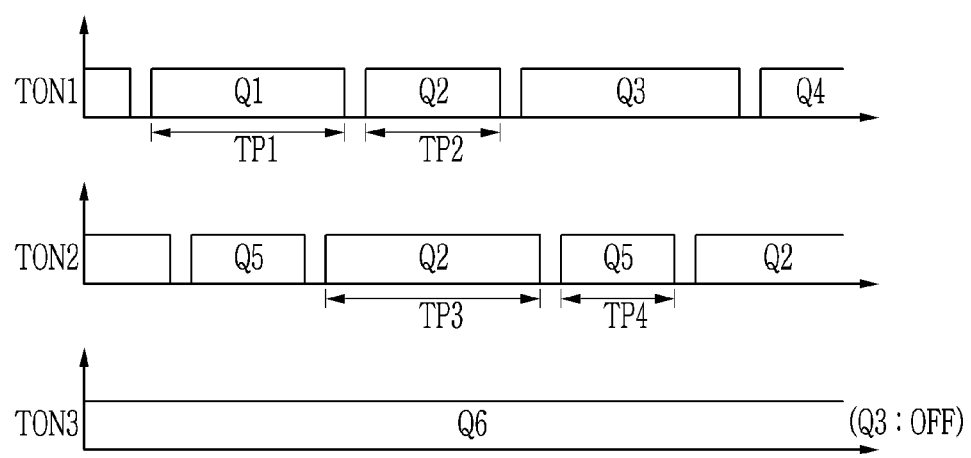
FIG. 7 illustrates a switching operation of a PFC circuit according to an embodiment.

FIG. 7 illustrates a switching operation of a PFC circuit according to an embodiment.

As shown in FIG. 7, an on-state switch among the switches Q1 and Q4 of the first switch leg 21 is shown in a "TON1" waveform diagram, an on-state switch among the switches Q2 and Q5 of the second switch leg 22 is shown in a "TON2" waveform diagram, and an on-state switch among the switches Q3 and Q6 of the third switch leg 23 is shown in a "TON3" waveform diagram. In the single-phase load condition, the switch Q3 of the third switch leg 23 is turned off, and the switch Q6 thereof is turned on.

During a period TP1 in which the switch Q1 is turned on and the switch Q4 is turned off in the first switch leg 21, a current flows in the inductor 25 by the input voltage charged in the PFC link capacitor 24. The current of the inductor 25 flows through the load 60, the relay RL6, and the switch Q6, and power is supplied to the load 60. Subsequently, during a period TP2 in which the switch Q1 is turned off and the switch Q4 is turned on in the first switch leg 21, the current of the inductor 25 flows through the relay RL6, the switch Q6, and the switch Q4. Between the periods TP1 and TP2, there is a dead time in which both switches Q1 and Q4 are turned off.

During a period TP3 in which the switch Q2 is turned on and the switch Q5 is turned off in the second switch leg 22, a current flows in the inductor 26 by the input voltage charged in the PFC link capacitor 24. The current of the inductor 26 flows through the load 60, the relay RL6, and the switch Q6, and power is supplied to the load 60. Subsequently, during a period TP4 in which the switch Q4 is turned off and the switch Q2 is turned on in the second switch leg 22, the current of the inductor 25 flows through the relay RL6, the switch Q6, and the switch Q4. Between the periods TP3 and TP4, there is a dead time in which both switches Q2 and Q5 are turned off.

The charging device 1 according to the embodiment described above may supply power from the battery 40 to the load. The charging device 1 according to the embodiment may be applied to an electric vehicle, and the battery 40 supplies electric power required to operate the electric vehicle.

Charging is possible regardless of the rated voltage of the battery through the charging device according to the embodiment. In addition, the charging device may supply power from the battery to the load (vehicle to load, V2L) or from the battery to the grid (vehicle to grid, V2G). In addition, since a frequency variable range of the charging device is narrow compared to an operating frequency range of the LLC converter, the transformer may be down-sized. In the PFC circuit according to the embodiment, a current stress applied to the switch of the PFC circuit is constant regardless of a step-up ratio. Therefore, the charging device according to the embodiment may implement in a high step-up ratio.

Particularly, in the V2G implementation, the link voltage variable method is applied to the charging device, so that the output voltage range that may be supplied to the grid is very wide. In addition, the resonant gain of the LLC converter does not change because the turn ratio is substantially the same in the reverse power supplying and the forward power supplying. In the reverse direction power supplying, power of 380 V or higher may be supplied without a separate converter at the load side.

In addition, the AC input filter according to the embodiment further includes the capacitor connected between the neutral point and the ground, and the capacitors of the Y capacitor device are connected closer to the input terminal than the relay, so it is possible to minimize the increase in the number of elements according to the increase in the number of stages.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A charging device comprising:
    a power factor correction (PFC) circuit comprising first, second and third inductors and first, second and third switch legs connected to the first, second and third inductors, respectively;
    a relay network configured to control connection between the first, second and third inductors and first, second and third input terminals according to a phase of a power grid connected to the first, second and third input terminals, wherein the relay network comprises a first relay connected between a neutral point and the third inductor; and
    a capacitor having a first end connected to the neutral point with respect to the first, second and third input terminals and a second end connected to ground, wherein the first end of the capacitor is positioned closer to the neutral point than the first relay.

2. The charging device of claim 1, further comprising a relay control circuit connected to the first, second and third input terminals and configured to detect one of the first, second and third input terminals to which a power source is connected and to control the relay network.

3. The charging device of claim 1, wherein the relay network comprises:
    a second relay including a first end connected to the first input terminal and the first inductor and a second end connected to the second input terminal and the second inductor;
    a third relay connected between the second input terminal and the second inductor;
    a fourth relay connected between the third input terminal and the third inductor; and
    a fifth relay connected in parallel to the third inductor.

4. The charging device of claim 3, further comprising:
    a first capacitor connected between the ground and a first contact point closer to the first input terminal than the first end of the second relay, in a first power line between the first input terminal and the first inductor;
    a second capacitor connected between the ground and a second contact point closer to the second input terminal than the third relay, in a second power line between the second input terminal and the second inductor; and
    a third capacitor connected between the ground and a third contact point closer to the third input terminal than the fourth relay, in a third power line between the third input terminal and the third inductor.

5. The charging device of claim 3, wherein:
    in response to the first, second and third input terminals being connected to respective phases of a three-phase power source, the relay network is configured to connect each of the phases of the three-phase power source to a corresponding one of the first, second and third switch legs, and the PFC circuit is configured to operate as a three-phase boost PFC; and
    in response to a single-phase power source being connected to one of the first, second and third input terminals, the relay network is configured to connect the single-phase power source to the first and second switch legs and to connect the third switch leg to the neutral point, and the PFC circuit is configured to operate as a single inductor type of an interleaved single-phase full-bridge PFC.

6. The charging device of claim 5, wherein in response to the first, second and third input terminals being connected to the respective phases of the three-phase power source, the first relay, the second relay, and the fifth relay are turned off, and the third relay and the fourth relay are turned on.

7. The charging device of claim 5, wherein in response to a single-phase power source being connected to the first input terminal, the first relay, the second relay, and the fifth relay are turned on, and the third relay and the fourth relay are turned off.

8. The charging device of claim 3, wherein the relay network further comprises a sixth relay connected in parallel to a resistor connected between the first input terminal and the first inductor.

9. The charging device of claim 8, wherein the charging device is configured to turn on the sixth relay after a peak of a voltage inputted to the PFC circuit.

10. A charging device comprising:
    a power factor correction (PFC) circuit comprising first to third inductors and first, second and third switch legs connected to the first, second and third inductors, respectively;
    a relay network configured to control connection between the first, second and third inductors and first, second and third input terminals according to a phase of a power grid connected to the first, second and third input terminals, wherein the relay network comprises:
        a first relay connected between a neutral point and the third inductor;
        a second relay including a first end connected to the first input terminal and the first inductor and a second end connected to the second input terminal and the second inductor;
        a third relay connected between the second input terminal and the second inductor;
        a fourth relay connected between the third input terminal and the third inductor; and
        a fifth relay connected in parallel to the third inductor;
    a capacitor having a first end connected to the neutral point with respect to the first, second and third input terminals and a second end connected to ground, wherein the first end of the capacitor is positioned closer to the neutral point than the first relay; and
    a power converting circuit connected between the PFC circuit and a battery and configured to transmit power from the PFC circuit to the battery.

11. The charging device of claim 10, wherein:
    the first switch leg includes a first switch connected between the first inductor and a first input terminal of the power converting circuit and a second switch connected between the first inductor and a second input terminal of the power converting circuit;
    the second switch leg includes a third switch connected between the second inductor and a first input terminal of the power converting circuit and a fourth switch connected between the second inductor and a second input terminal of the power converting circuit; and the third switch leg includes a fifth switch connected between the third inductor and a first input terminal of the power converting circuit and a sixth switch connected between the third inductor and a second input terminal of the power converting circuit.

12. The charging device of claim 11, wherein:

in response to a single-phase power source being connected to the first input terminal, the first relay, the second relay, and the fifth relay are turned on, and the third relay and the fourth relay are turned off;

during a period in which the single-phase power source is a positive voltage, a period in which the first switch, the third switch, and the sixth switch are turned on and a period in which the second switch, the fourth switch, and the sixth switch are turned on are repeated; and during a period in which the single-phase power source is a negative voltage, a period in which the second switch, the fourth switch, and the fifth switch are turned on and a period in which the first switch, the third switch, and the fifth switch are turned on are repeated.

13. A charging device comprising:

a power factor correction (PFC) circuit comprising first, second and third inductors and first, second and third switch legs connected to the first, second and third inductors, respectively;

a relay network configured to control connection between the first, second and third inductors and first, second and third input terminals according to a phase of a power grid connected to the first, second and third input terminals, wherein the relay network comprises:
 a first relay connected between a neutral point and the third inductor;
 a second relay including a first end connected to the first input terminal and the first inductor and a second end connected to the second input terminal and the second inductor;
 a third relay connected between the second input terminal and the second inductor;
 a fourth relay connected between the third input terminal and the third inductor; and
 a fifth relay connected in parallel to the third inductor;

a capacitor having a first end connected to the neutral point with respect to the first, second and third input terminals and a second end connected to ground, wherein the first end of the capacitor is positioned closer to the neutral point than the first relay; and wherein in response to the first, second and third input terminals being connected to respective phases of a three-phase load, the relay network is configured to connect each of the phases of the three-phase load to a corresponding one of the first, second and third switch legs, and the PFC circuit is configured to operate as a three-phase inverter; and wherein in response to a single-phase load being connected to one of the first, second and third input terminals, the relay network is configured to connect the single-phase load to the first and second switch legs and to connect the third switch leg to the neutral point, and the PFC circuit is configured to operate as a single-phase inverter.

14. The charging device of claim 13, further comprising:

a first capacitor connected between the ground and a first contact point closer to the first input terminal than the first end of the second relay, in a first power line between the first input terminal and the first inductor;

a second capacitor connected between the ground and a second contact point closer to the second input terminal than the third relay, in a second power line between the second input terminal and the second inductor; and a third capacitor connected between the ground and a third contact point closer to the third input terminal than the fourth relay, in a third power line between the third input terminal and the third inductor.

15. The charging device of claim 14, wherein in response to the first, second and third input terminals being connected to the respective phases of a three-phase load, the first relay, the second relay, and the fifth relay are turned off, and the third relay and the fourth relay are turned on.

16. The charging device of claim 14, wherein in response to a single-phase load being connected to the first input terminal, the first relay, the second relay, and the fifth relay are turned on, and the third relay and the fourth relay are turned off.

17. The charging device of claim 14, further comprising a relay control circuit connected to the first, second and third input terminals and configured to detect one of the first, second and third input terminals to which a load is connected and to control the relay network.

18. The charging device of claim 14, further comprising a power converting circuit connected between the PFC circuit and a battery and configured to transmit power from the battery to the PFC circuit.

19. The charging device of claim 18, wherein:

the first switch leg includes a first switch connected between the first inductor and a first input terminal of the power converting circuit and a second switch connected between the first inductor and a second input terminal of the power converting circuit;

the second switch leg includes a third switch connected between the second inductor and a first input terminal of the power converting circuit and a fourth switch connected between the second inductor and a second input terminal of the power converting circuit; and the third switch leg includes a fifth switch connected between the third inductor and a first input terminal of the power converting circuit and a sixth switch connected between the third inductor and a second input terminal of the power converting circuit.

20. The charging device of claim 19, wherein, in response to a single-phase load being connected to the first input terminal:

the first relay, the second relay, and the fifth relay are turned on, and the third relay and the fourth relay are turned off;

the first switch and the second switch are alternately switched, the third switch and the fourth switch are alternately switched, an on period of the fourth switch entirely overlaps an on period of the first switch, and an on period of the second switch entirely overlaps an on period of the third switch; and the fifth switch is turned off, and the sixth switch is turned on.

* * * * *